L. H. PERLMAN.
WHEEL.
APPLICATION FILED JUNE 24, 1916.
1,230,075.
Patented June 12, 1917.
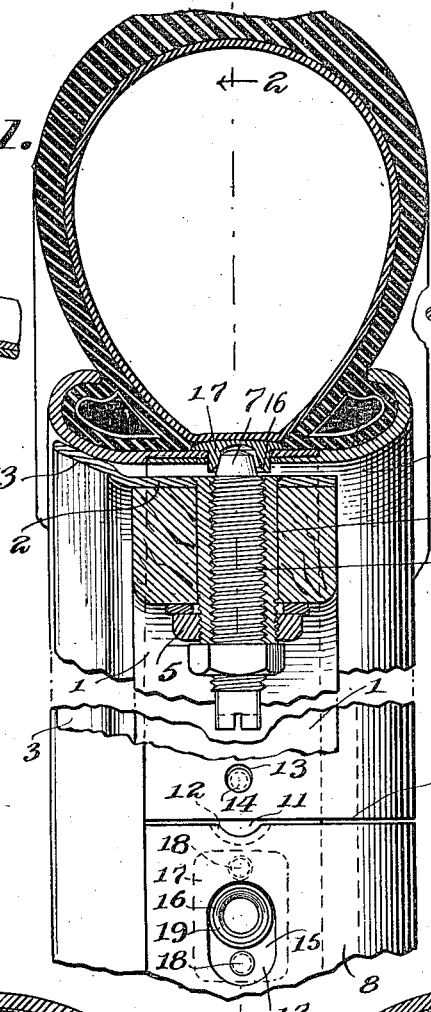
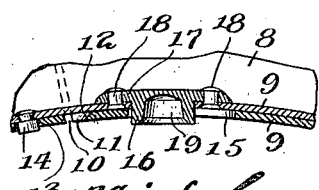
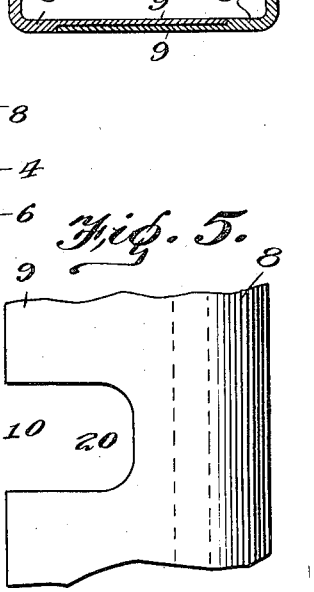
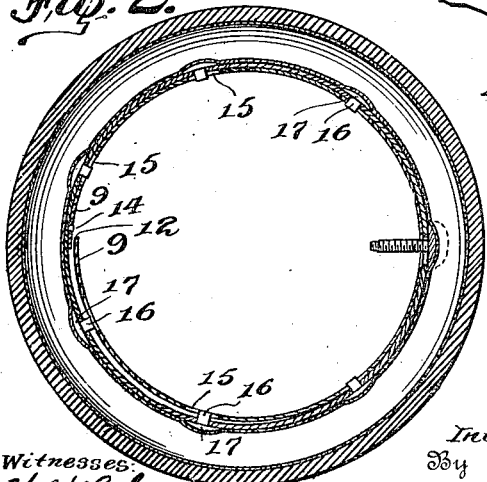
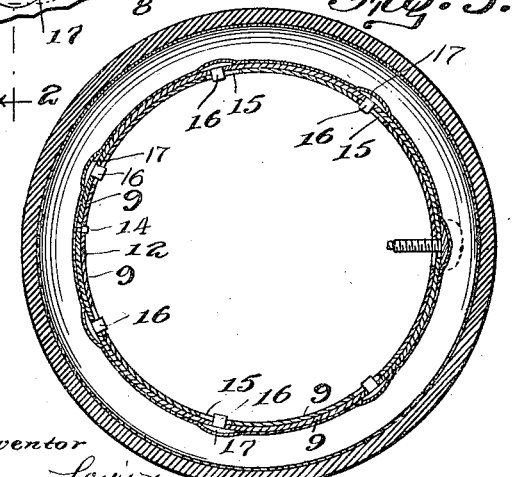

UNITED STATES PATENT OFFICE.

LOUIS H. PERLMAN, OF NEW YORK, N. Y.

WHEEL.

1,230,075.

Specification of Letters Patent.   Patented June 12, 1917.

Application filed June 24, 1916.   Serial No. 105,692.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in wheels and more particularly to improvements in demountable rims for such wheels as those employed on automobiles and like vehicles.

An object in view is the production of a structure with which hard bead tires may be employed and the parts of the rim designed to be manipulated for enabling application and removal of such tires are adapted for operation with maximum ease and facility.

With this and further objects in view, as will in part hereinafter become apparent and in part be stated the invention comprises certain novel constructions, combinations and arrangements of parts as subsequently specified and claimed.

In the accompanying drawing:—

Figure 1 is a sectional perspective view of a wheel structure embodying the features of the present invention, intermediate portions being broken away for the saving of space and a part of the felly and fixed rim being broken out for disclosing the inner face of a demountable rim in elevation.

Fig. 2 is a transverse axial section taken on the plane such as is indicated by line 2—2 of Fig. 1, the wheel being omitted and the detachable section of demountable rim being sprung to the position assumed just prior to its final assemblage with the main body of the rim.

Fig. 3 is a similar view of the same with the detachable section fully assembled with the main body of the rim.

Fig. 4 is an enlarged detail fragmentary section taken substantially on the same plane as Figs. 2 and 3, showing parts at the place where the cross cut occurs in the detachable section of rim.

Fig. 5 is a detail fragmentary view in elevation of the detachable section of rim showing notch for accommodating the valve stem.

Fig. 6 is a transverse section through a modified embodiment of rim.

Referring to the drawing by numerals, 1 indicates the wood felly of a wheel body of the usual type now employed on automobiles. On to the felly 1 is shrunk the fixed rim 2 having the supporting stop flange 3. A sleeve 4 extends through the rim 2 and felly 1 and is clamped in place by a retaining nut 5 engaging the inner end portion of sleeve 4 and acting on the inner face of the felly 1, the sleeve being held against being drawn inward by an appropriate flange at its outer end over-hanging the portion of the material of the rim 2. A number of sleeves 4 are employed and are preferably spaced about the wheel body on which the felly 1 is a part, the hub and spokes being omitted. Each of the sleeves 4 is threaded internally for receiving a radially disposed bolt 6, each bolt 6 carrying at its outer end a locking wedge 7 which for the purposes of the present case is shown as the tapered tip of the bolt. This tip, however, is the active factor in forming the rim locking means, and the bolt 6 itself is merely an actuator and means of anchorage for the wedge 7.

A demountable rim 8 is arranged to be slid axially on to and off of the wheel body from that side not provided with the supporting flange. The web of the rim 8 is split circumferentially to form separable sections, each provided with a lapping web portion 9 lapping the web portion 9 of the other section and abutting against the annular shoulder formed at the respective outer terminus of the given opposite web section 9. One of the sections of rim 8 has its web portion 9 encircled by the web portion 9 of the other and lies within the same, this particular section is cross-cut as indicated at 10. Ring like structures in this art having such cross cuts have been referred to and are known to some extent as "split" and while that term is believed to be inaccurately applied, it may be as appropriately applied to the cross cut 10 as to the structure of the so-called split rings.

At one point along the edge of the cross cut 10 the cross cut rim section is formed with a notch 11, having an outwardly beveled edge 12 as indicated in dotted lines in Fig. 1 and seen in full lines in Fig. 4. This notch 11 is adapted to receive a prying instrument such as a screw driver for enabling the end of the cross cut section having the notch 11 to be sprung radially inward as indicated in Fig. 2 for purposes hereinafter stated. Near the opposite end of the cross cut section from that having the notch 11, the section is formed with an aperture 13 for receiving a retaining pin 14 fixed to and extending radially inward from the web 9 of the other section of rim 8.

The cross cut section of rim 8 is formed at points corresponding in number and location to the number of locking wedges 7 employed with openings 15, 15 preferably in the form of circumferentially extending slots. The uncut section of rim 8 is in the form of a continuous ring and its web 9 carries a series of relatively short shanks 16 equal in number to the number of openings 15 and located for having one shank 16 extended through each opening 15. Each shank 16 is of a diameter equal to the width of the respective opening 15 so as to prevent any axial shifting of the cross cut section of rim 8 when the parts are assembled. Each shank 16 is carried by a head 17 arranged at the outer face of rim 8 and fixed to the web section 9 of the uncut section of rim as by rivets 18, 18. Each shank 16 is recessed from its inner end outward as indicated at 19, the recess being formed conical or frusto conical to correspond to the incline of the walls of the respective wedge 7, the recess 19 of each shank 16 being adapted to receive a corresponding wedge 7, as clearly indicated in Fig. 1 for locking the rim 8 in position and tensioning it on the wheel.

In operation the wedges 7 acting against the inclined walls of the recesses 19 thrust the rim 8 to its final position in contact with the flange 3 and tensioned in operative position on the wheel. To demount the rim 8, it is only necessary to back off the bolts 6 until wedges 7 are withdrawn from recesses 19, so that the shanks 16 can clear the ends of the wedges 7. The rim 8 is then withdrawn axially, and if it is desirable to remove the tire carried by the rim, an instrument such as a screw driver is inserted in the recess 11, and the end of the cross cut section is sprung radially inward to the position indicated in Fig. 2. The thus free end of the cross section is moved still farther inward until it clears the adjacent shank 16 and is then moved axially until it is free of the uncut section, the inward and axial movement being continued until the cut section is entirely withdrawn from the uncut section with a movement akin to an unscrewing action. The tire may then be radially withdrawn from the uncut section and a new tire supplied. The cut section is then reapplied by first applying the recess 13 over the pin or stud 14 and then working the cut section into place with a movement conversely to that described in withdrawing the section until the parts assume the position indicated in Fig. 2, whereupon the screw driver may be inserted between the two ends at the place of the cross cut 10 and moved to pry the free end over into registering position, that is, the position seen in Fig. 4. When the parts have been sprung in this position and the tire inflated they are ready for use. It is obvious, of course, that the cut section will never be detached as long as the tire remains inflated, and there is no possibility of accidental detachment in view of the stability of the uncut section in a radial direction, and the impossibility of the cut section for detaching axially. To facilitate the removal and application of the cut section in the manner described, an appropriate notch or opening 20 is formed in the web portion 9 for accommodating the stem of the valve of the inner tube of the tire.

In Fig. 6 is shown a rim identical with rim 8, except that the tire retaining flanges are of the "straight side" type instead of the clencher type. The same reference numerals have, therefore, been applied and the same description is applicable.

What I claim is:—

1. In a demountable rim, the combination, of separable rim sections, and lock receiving means retaining the sections against axial separation but leaving them free for radial separation.

2. In a demountable rim, the combination, of separable sections, and lock receiving means fixed to one of the sections and extending through the other in position for preventing axial separation of the sections while leaving the last named section free for radial separation.

3. In a demountable rim, the combination, of an uncut section and a cross cut section having lapping web portions, and a lock receiving shank fixed to the uncut section and extending through the cut section for leaving the cut section free for radial movement relative to the uncut section.

4. In a demountable rim, the combination, of an uncut section and a cross cut section having lapping web portions, and a lock receiving shank fixed to the uncut section and extending through the cut section for leaving the cut section free for radial movement relative to the uncut section, the shank being formed with a lock receiving recess.

5. In a demountable rim, the combination, of an uncut section and a cross cut section having lapping web portions, and a lock receiving shank fixed to the uncut section and extending through the cut section for leaving the cut section free for radial movement relative to the uncut section, the shank being formed with a head overlying the outer face of and connected to the web of the uncut section.

In testimony whereof I affix my signature in presence of two witnesses.

LOUIS H. PERLMAN.

Witnesses:
 EMMA M. FRÜHLING,
 EDGAR M. KITCHIN.

Copies of this patent may be obtained for five cents each, by addressing the "Commissioner of Patents, Washington, D. C."